United States Patent
Liu et al.

(10) Patent No.: US 7,630,041 B2
(45) Date of Patent: Dec. 8, 2009

(54) LIQUID CRYSTAL CELL ASSEMBLY FOR LIQUID CRYSTAL DISPLAY

(75) Inventors: Liang Liu, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 327 days.

(21) Appl. No.: 11/565,560

(22) Filed: Nov. 30, 2006

(65) Prior Publication Data

US 2007/0296897 A1    Dec. 27, 2007

(30) Foreign Application Priority Data

Jun. 23, 2006    (CH) .................... 2006 1 0093941

(51) Int. Cl.
*G02F 1/1337* (2006.01)
*H01J 9/00* (2006.01)
(52) U.S. Cl. ......................... 349/123; 445/24
(58) Field of Classification Search ............ None
See application file for complete search history.

(56) References Cited

U.S. PATENT DOCUMENTS 6,312,303 B1 *  11/2001  Yaniv et al. ............... 445/24
7,110,058 B2 *   9/2006  Hayase et al. ............. 349/43
2005/0260426 A1* 11/2005  Kwok et al. ............. 428/473.5
2007/0003711 A1*  1/2007  Hwang et al. ............ 428/1.31

OTHER PUBLICATIONS

Kaili Jiang et al., Spinning continuous carbon nanotube yarns, Nature, Oct. 24, 2002, pp. 801, vol. 419.

* cited by examiner

*Primary Examiner*—Tina M Wong
(74) *Attorney, Agent, or Firm*—D. Austin Bonderer

(57) ABSTRACT

A liquid crystal display includes a first base plate, a second base plate, a first alignment film, a second alignment film and a liquid crystal layer. The first base plate and the second base plate separately have an inner surface and the second base plate is located with its inner surface opposite to the inner surface of the first base plate. The first alignment film is arranged on the inner surface of the first base plate and comprises a plurality of juxtaposed one-dimensional nanostructures oriented in a first direction. Wherein the one-dimensional nanostructures cooperatively function as at least one of a first polarizer and a first transparent electrode. The second alignment film is arranged on the inner surface of the second base plate, and the liquid crystal layer is sandwiched between the first alignment film and the second alignment film.

19 Claims, 4 Drawing Sheets

LIQUID CRYSTAL CELL ASSEMBLY FOR LIQUID CRYSTAL DISPLAY

CROSS-REFERENCE TO RELATED APPLICATION

This application is related to a commonly-assigned copending application entitled, "liquid crystal display and manufacturing method therefor", filed on Jun. 21, 2006 (application No. U.S. Ser. No. 11/473,217). Disclosure of the above identified application is incorporated herein by reference.

BACKGROUND OF THE INVENTION

1. Field of the Invention

The present invention relates to liquid crystal cell assemblies for liquid crystal displays (LCDs) and, more particularly, to a liquid crystal cell assembly for LCDs with alignment films.

2. Description of Related Art

Because LCDs have the advantages of portability, low power consumption, and low radiation, they have been widely used in various portable information products such as notebooks, personal digital assistants (PDAs), video cameras, and the like. Furthermore, LCDs are considered to have the potential to completely replace cathode ray tube (CRT) monitors and televisions.

Referring to FIG. 4, a conventional liquid crystal cell assembly 100 for LCDs generally includes a first base plate 104, a second base plate 112, and a liquid crystal layer 118 located between the two base plates 104 and 112. An alignment layer 108 is formed on an inner surface of the first base plate 104 and a first transparent electrode layer 106 is formed therebetween. A first polarizer 102 is formed on an outer surface of the first base plate 104. An alignment layer 116 is formed on an inner surface of the second base plate 112 and a second transparent electrode layer 114 is formed therebetween. A second polarizer 110 is formed on an outer surface of the first base plate 112.

The liquid crystal layer 118 includes a plurality of rod-like liquid crystal molecules 1182. A plurality of parallel fine grooves 1082 is formed on an inner surface of the alignment layer 108. A plurality of parallel fine grooves 1162 are formed on an inner surface of the alignment layer 116. The grooves 1082 and 1162 function so as to align the orientation of the liquid crystal molecules 1182, i.e., to align the liquid crystal molecules 1182 adjacent to the alignment layers 108 and 116 parallel to the grooves 1082 and 1162 respectively. When the grooves 1082 and 1162 are at right angles and the base plates 104 and 112 are at appropriate spacing, the liquid crystal molecules 1182 can automatically turn 90 degrees from top to bottom.

The alignment layers 108 and 116 are important to the liquid crystal cell assembly 100. Alignment qualities of the alignment layers 108 and 116 are one of the key factors that determine the display quality of the liquid crystal cell assembly 100. The alignment layers 108 and 116 can be made using a rubbing method. The rubbing method can be exemplified using the manufacturing method for the alignment layer 116 as below. The manufacturing method for the alignment layers 116 generally includes the steps of: coating a layer of alignment material, such as polyimide, on the inner surface of the second transparent electrode layer 114; and rubbing the surface of the alignment material using rubbing cloth to form the plurality of fine grooves 1162.

However, some drawbacks arise from a mechanical contact of the rubbing cloth with the surface of the alignment material. This method is complicated because a baking process of the polyimide layer takes long time, and the rubbing introduces large electrostatic charges as well as plenty of dust contamination, which in turn needs other facilities and rinse processes to eliminate. In addition, the rubbing cloth has a limited lifespan and needs to be replaced frequently.

The polarizers 102 and 110 and the transparent electrode layers 106 and 114 play an important role in making the liquid crystal cell assembly 100 display images. However, the polarizers 102 and 110 and the transparent electrode layers 106 and 114 may make the liquid crystal cell assembly 100 thicker and reduce the transparency of the liquid crystal cell assembly 100. Moreover, the polarizers 102 and 110 and the transparent electrode layers 106 and 114 may increase the cost for manufacturing the liquid crystal cell assembly 100.

What is needed, therefore, is a liquid crystal cell assembly with a good alignment quality and a thin structure.

SUMMARY OF THE INVENTION

In a first preferred embodiment of the present invention, a liquid crystal display includes a first base plate, a second base plate, a first alignment film, a second alignment film and a liquid crystal layer. The first base plate and the second base plate separately have an inner surface and the second base plate is located with its inner surface opposite to the inner surface of the first base plate. The first alignment film is arranged on the inner surface of the first base plate and comprises a plurality of juxtaposed one-dimensional nanostructures oriented in a first direction. Wherein the one-dimensional nanostructures cooperatively function as at least one of a first polarizer and a first transparent electrode. The second alignment film is arranged on the inner surface of the second base plate, and the liquid crystal layer is sandwiched between the first alignment film and the second alignment film.

In another preferred embodiment of the present invention, a liquid crystal cell assembly for liquid crystal display includes a first transparent base plate, a second transparent base plate, a first one-dimensional nanostructure film, a second one-dimensional nanostructure film and a liquid crystal layer. The first base plate and the second base plate separately have an inner surface and the second base plate is opposite to the inner surface of the first base plate. The first one-dimensional nanostructure film is arranged on the first surface of the first base plate and includes a plurality of juxtaposed one-dimensional nanostructures oriented in a first direction, and the second one-dimensional nanostructure film is arranged on the second surface of the second base plate and includes a plurality of juxtaposed one-dimensional nanostructures oriented in a second direction perpendicular to the first direction. The liquid crystal layer is sandwiched between the first one-dimensional nanostructure film and the second one-dimensional nanostructure film.

Other advantages and novel features will become more apparent from the following detailed description of the present liquid crystal cell assembly, when taken in conjunction with the accompanying drawings.

BRIEF DESCRIPTION OF THE DRAWINGS

Many aspects of the liquid crystal cell assembly can be better understood with reference to the following drawings. The components in the drawings are not necessarily drawn to scale, the emphasis instead being placed upon clearly illustrating the principles of the present liquid crystal cell assem

DETAILED DESCRIPTION OF THE INVENTION

Reference will now be made to the drawings to describe preferred embodiments of the liquid crystal cell assembly and its manufacturing method, in detail.

Figure 1:
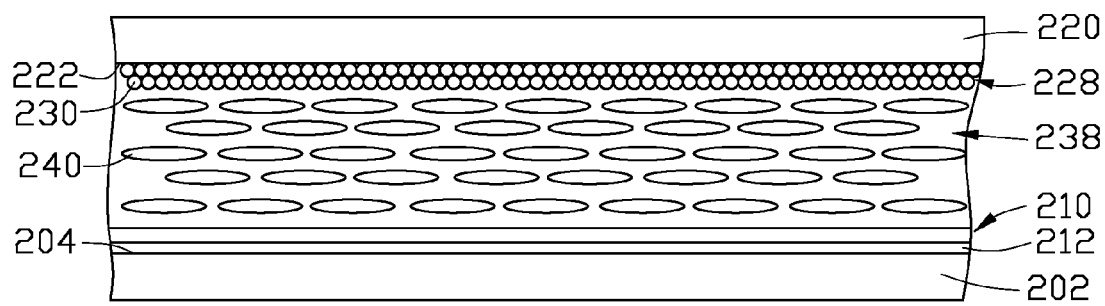
- FIG. 1 is a schematic, plan view of a liquid crystal cell assembly in accordance with a preferred embodiment.
Figure 1:
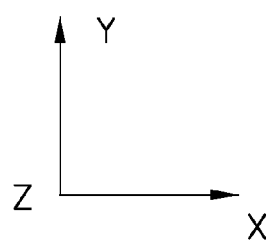
Figure 2:
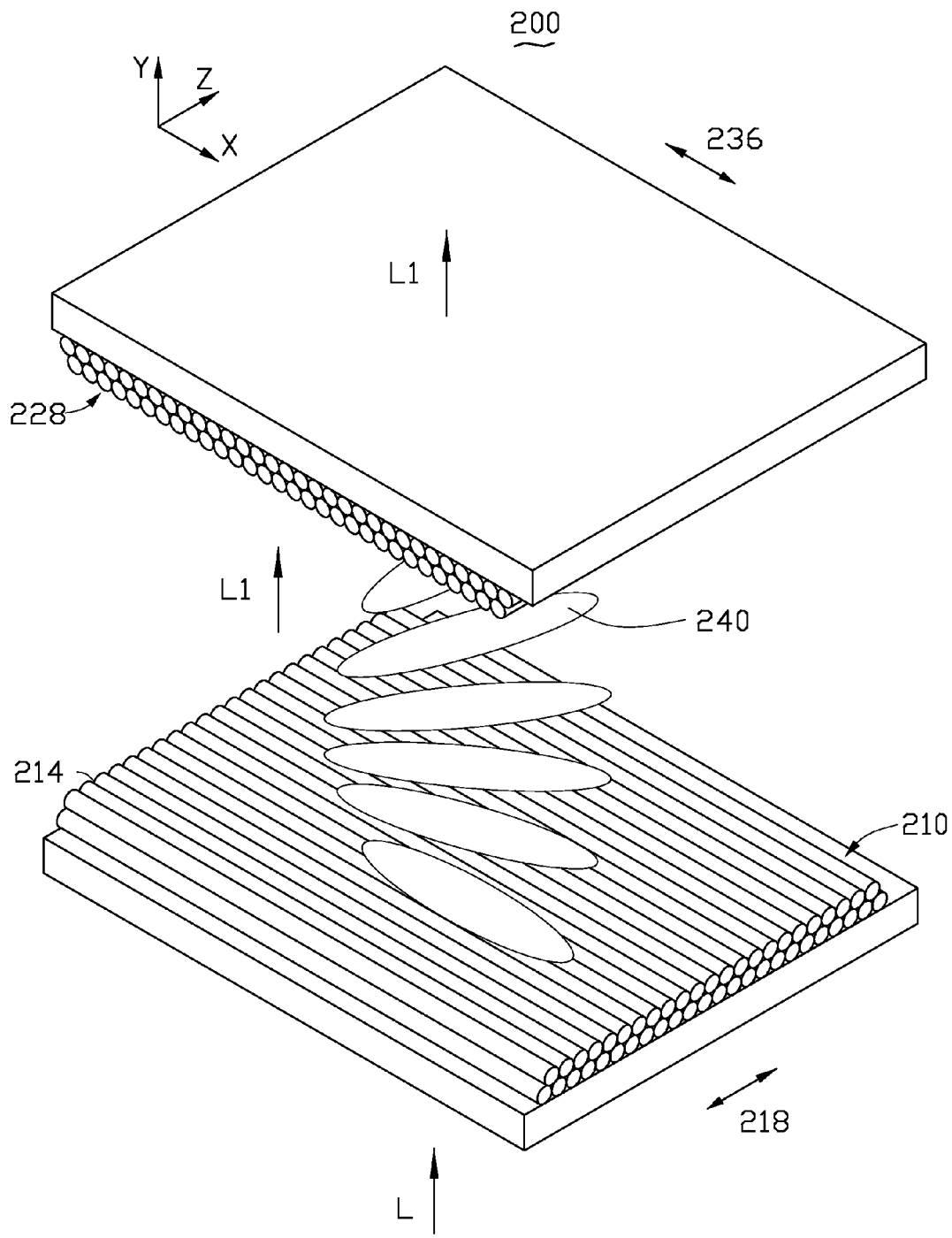
FIG. 2 is a schematic, isometric view of the liquid crystal cell assembly of FIG. 1 in a light transmitting state.

Referring to FIGS. 1 and 2, a liquid crystal cell assembly 200 in accordance with a preferred embodiment is shown. The liquid crystal cell assembly 200 mainly includes a first base plate 202, a second base plate 220, and a liquid crystal layer 238.

The first base plate 202 is opposite to the second base plate 220. Generally, the first base plate 202 is a thin film transistor plate (TFT plate) and the second base plate 220 is a color filter plate (CF plate), and both of the first and second base plate 202 and 220 are transparent. A first alignment film 210 is arranged on an inner surface 204 of the first base plate 202 and a second alignment film 228 is arranged on an inner surface 222 of the second base plate 220. The liquid crystal layer 238 includes a plurality of rod-like liquid crystal molecules 240 and is sandwiched between the first alignment film 210 and the second alignment film 228.

The first alignment film 210 includes a plurality of juxtaposed one-dimensional nanostructures 212 oriented on the first base plate 202 along the direction of x-axis. The one-dimensional nanostructures 212 can be selected from a group consisting of one-dimensional carbon nanostructures, one-dimensional semiconductor nanostructures, one-dimensional metal nanostructures and so on. The one-dimensional carbon nanostructure can be selected from a group consisting of single-walled carbon nanotube, carbon nanowire, multi-walled carbon nanotube, single-walled carbon nanotube bundles (SWNT bundles), multi-walled carbon nanotube bundles (MWNT bundles), MWNT yarn and so on. MWNT yarn was introduced by Kaili Jiang et al. in an article titled "spinning continuous carbon nanotube yarns" (Nature, vol. 419, pp. 801, 2002), the disclosure thereof is incorporated herein by reference. The one-dimensional semiconductor nanostructure can be selected from a group consisting of silicon nanotube, silicon nanowire, gallium-nitride nanotube, gallium-nitride nanowire, zinc-oxide nanotube, zinc-oxide nanowire, zinc-oxide nanobelt and so on. The one-dimensional metal nanostructure can be selected from a group consisting of iron nanotube, iron nanowire, gold nanotube, gold nanowire, titanium nanotube, titanium nanowire, copper copper nanotube, copper nanowire, copper nanobelt and so on.

A thickness of the first alignment film 210 varies in accordance with kinds of the one-dimensional nanostructures 212 being adopted. For example, when a single layer of the SWNTs is adopted, the thickness of the first alignment film 210 can be about 1 nanometer. When the super-aligned MWNT yarns are adopted, the thickness of the first alignment film 210 can be up to 1 micron. It is to be understood that the one-dimensional nanostructures 212 can be formed by a plurality of juxtaposed done-dimensional nanostructures dispersed separately or connected end to end.

According to the preferred embodiment, the first alignment film 210 can have three functions: Firstly, the one-dimensional nanostructures 212 have a good electric conductivity, thus the carbon nanotube 210 can be used as an electrode layer of the LCD 200. Secondly, the one-dimensional nanostructures 212 are aligned juxtaposedly and can polarize natural light, thus the first alignment film 210 can be used as a polarizer of the LCD 200. Finally, the first alignment film 210 has is tube shaped and every two adjacent carbon nanotubes of the first alignment film 210 define a fine groove 214 (referring to FIG. 2) therebetween, thus the first alignment film 210 can align the liquid crystal molecules 240 adjacent thereto parallel to the grooves 214.

The structure and function of the second alignment film 228 are the same as the first alignment film 210 and the difference is that carbon nanotubes 230 of the second alignment film 228 are oriented on the inner surface of the second base plate 220 along the direction of z-axis.

Referring to FIG. 2, when no voltage is applied to the alignment films 210 and 228, the arrangement of the liquid crystal molecules 240 is in accordance with alignment directions of the alignment films 210 and 228. In this embodiment, the alignment directions of the alignment films 210 and 228 are at right angles, so the liquid crystal molecules 240 can automatically turn 90 degrees from top to bottom. When incident light L is incident upon the first alignment film 210, because a transmission axis 218 of the first alignment film 210 is along the direction of z-axis, only polarization light L1 with a polarization direction parallel to the transmission axis 218 can pass through the first alignment film 210. During the polarization light L1 passes through the liquid crystal molecules 240, because the liquid crystal molecules 240 turn 90 degrees from top to bottom, the polarization direction of the polarization light L1 is also turned 90 degrees and is parallel to the direction of x-axis. The polarization light L1 passing through the liquid crystal molecules 240 can pass through the second alignment film 228 because a transmission axis 236 of the second polarizer 234 is along the direction of x-axis. As a result, the liquid crystal cell assembly 200 transmits light.

Figure 3:
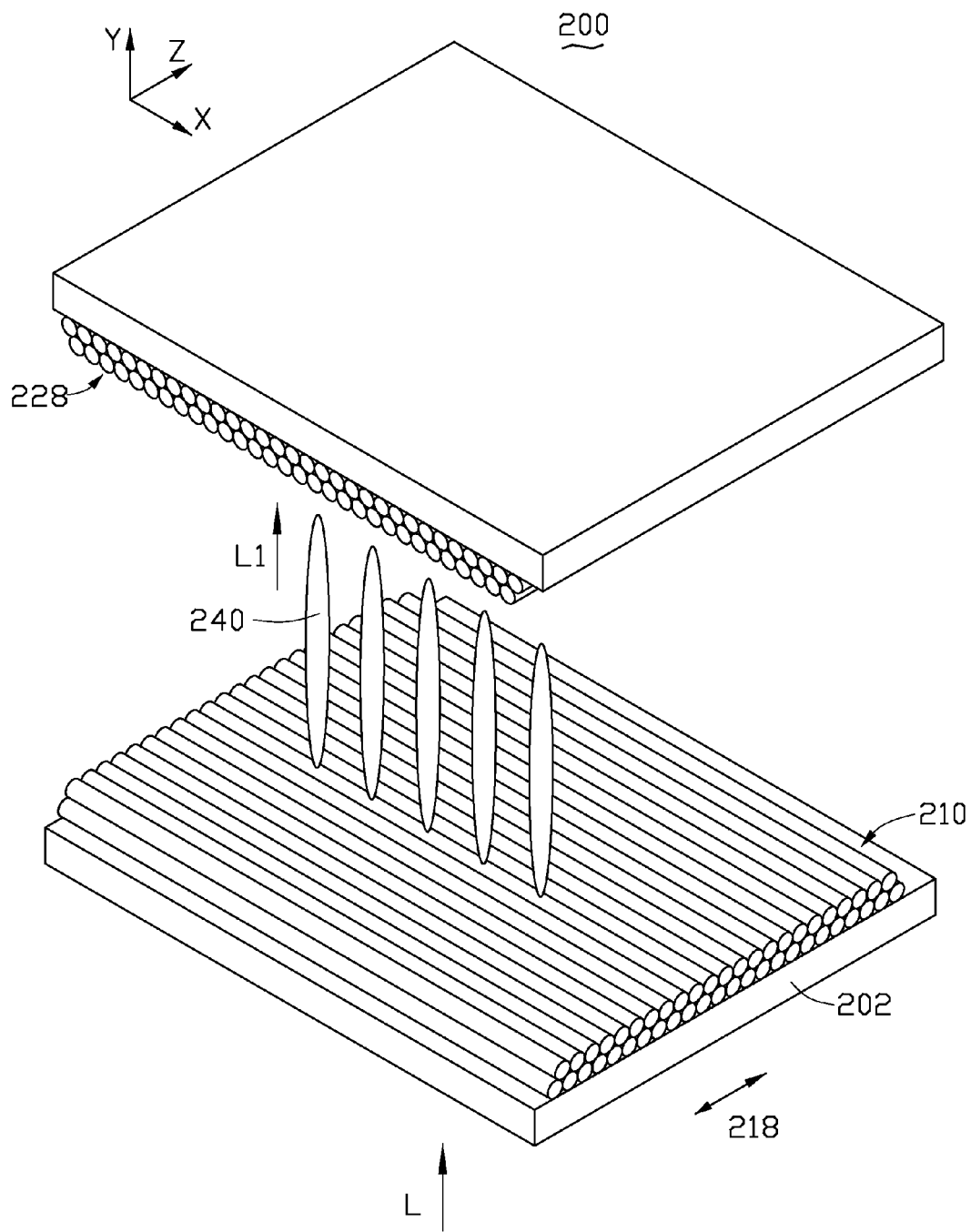
FIG. 3 is a schematic, isometric view of the liquid crystal cell assembly of FIG. 1 in a light blocking state.
Figure 4:
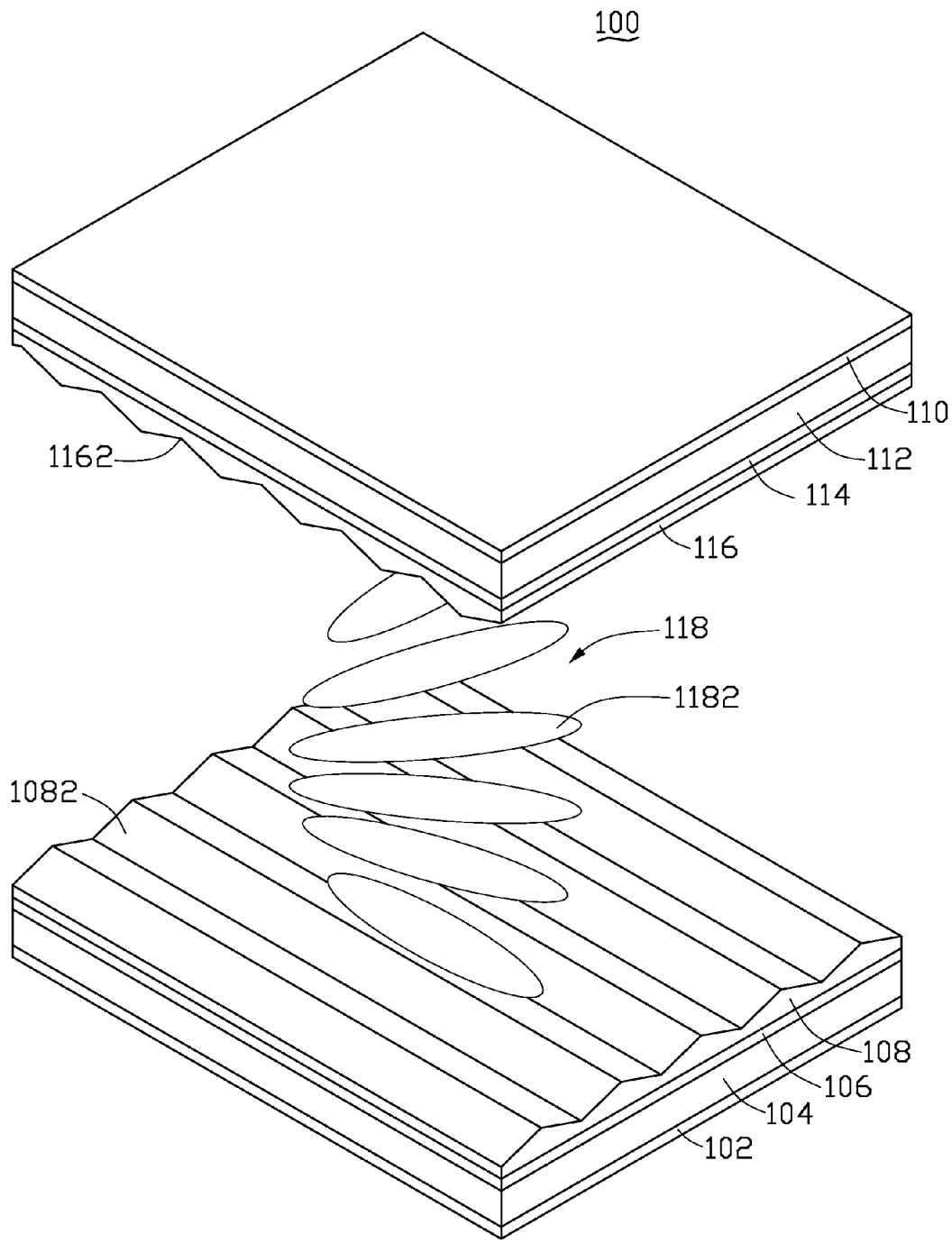
FIG. 4 is a schematic, isometric view of a conventional liquid crystal cell assembly.

Referring to FIG. 3, when a voltage is applied to the alignment films 210 and 228, an electrical field with a direction perpendicular to the alignment films 210 and 228 is formed. Under an influence of the electrical field, the arrangement of the liquid crystal molecules 240 is parallel to the direction of the electrical field. Now, the polarization light L1 passing through the liquid crystal molecules 240 will keep its polarized direction along Z axis and cannot pass through the second alignment film 228. As a result, the LCD 200 blocks light.

A manufacturing method for the present liquid crystal cell assembly 200 in accordance with a preferred embodiment will be described with reference to FIG. 1 as below. The method mainly includes the steps of: arranging the plurality of one-dimensional nanostructures 212 on the inner surface 204 of the first base plate 202 using a chemical vapor deposition method, a solution deposition method, or a direct laying method to form the first alignment film 210; forming the second alignment film 228 using the same method, wherein the plurality of carbon nanotubes 230 are arranged on the inner surface 222 of the second base plate 220 along the direction of the z-axis; assembling the first base plate 202 and the second base plate 220 to form a liquid crystal cell; filling the liquid crystal molecules 240 into the cell to achieve the present liquid crystal cell assembly 200.

The present liquid crystal cell assembly 200 utilizes one-dimensional nanostructures having three functions such as electrode, polarizer and alignment and no rubbing process is needed, so the liquid crystal cell assembly 200 becomes thinner and lighter and the problem of electrostatic charge and dust contamination can be avoided, and the present liquid crystal cell assembly manufacturing method can be simplified.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A liquid crystal cell assembly for liquid crystal display, comprising:
   a first base plate having an inner surface;
   a second base plate having an inner surface and being opposite to the inner surface of the first base plate;
   a first alignment film arranged on the inner surface of the first base plate, the first alignment film comprising a plurality of juxtaposed one-dimensional nanostructures oriented in a first direction, the one-dimensional nanostructures cooperatively functioning as at least one of a first polarizer and a first transparent electrode;
   a second alignment film arranged on the inner surface of the second base plate, the second alignment film comprising a plurality of juxtaposed one-dimensional nanostructures oriented in a second direction perpendicular to the first direction, the one-dimensional nanostructures cooperatively functioning as at least one of a second polarizer and a second transparent electrode; and
   a liquid crystal layer located between the first alignment film and the second alignment film.

2. The liquid crystal cell assembly as claimed in claim 1, wherein a thickness of the first alignment film is in a range from 1 nanometer to 1 micron.

3. The liquid crystal cell assembly as claimed in claim 1, wherein a thickness of the second alignment film is in a range from about 1 nanometer to about 1 micron.

4. The liquid crystal cell assembly as claimed in claim 1, wherein the first alignment film comprises a plurality of laminated layers each comprising a plurality of juxtaposed one-dimensional nanostructures oriented in the first direction.

5. The liquid crystal cell assembly as claimed in claim 1, wherein the one-dimensional nanostructure is selected from a group consisting of a one-dimensional carbon nanostructure, a one-dimensional semiconductor nanostructure, and a one-dimensional metal nanostructure.

6. The liquid crystal cell assembly as claimed in claim 5, wherein the one-dimensional carbon nanostructure is selected from a group consisting of single-walled carbon nanotube, carbon nanowire, multi-walled carbon nanotube, and multi-walled carbon nanotube yarn.

7. The liquid crystal cell assembly as claimed in claim 5, wherein the one-dimensional semiconductor nanostructure is selected from a group consisting of silicon nanotube, silicon nanowire, gallium-nitride nanotube, gallium-nitride nanowire, zinc-oxide nanotube, zinc-oxide nanobelt and zinc-oxide nanowire.

8. The liquid crystal cell assembly as claimed in claim 5, wherein the one-dimensional metal nanostructure is selected from a group consisting of iron nanotube, iron nanowire, gold nanotube, gold nanowire, titanium nanotube, titanium nanowire, copper nanotube, copper nanobelt and copper nanowire.

9. The liquid crystal cell assembly as claimed in claim 1, wherein one-dimensional nanostructures oriented in a first direction that is parallel to the surface of the first base plate.

10. A liquid crystal cell assembly for liquid crystal display, comprising:
    a first transparent base plate having a first surface;
    a second transparent base plate having a second surface opposite to the first surface of the first base plate;
    a first one-dimensional nanostructure film arranged on the first surface of the first base plate, the first one-dimensional nanostructure film comprising a plurality of juxtaposed one-dimensional nanostructures oriented in a first direction;
    a second one-dimensional nanostructure film arranged on the second surface of the second base plate, the second one-dimensional nanostructure film comprising a plurality of juxtaposed one-dimensional nanostructures oriented in a second direction perpendicular to the first direction; and
    a liquid crystal layer sandwiched between the first one-dimensional nanostructure film and the second one-dimensional nanostructure film.

11. The liquid crystal display cell assembly as claimed in claim 10, wherein each of the first and second one dimensional nanostructure films comprises a plurality of laminated layers each comprising a plurality of juxtaposed one-dimensional nanostructures.

12. The liquid crystal cell assembly as claimed in claim 10, wherein the one-dimensional nanostructure is selected form a group consisting of a one-dimensional carbon nanostructure, a one-dimensional semiconductor nanostructure, and a one-dimensional metal nanostructure.

13. The liquid crystal cell assembly as claimed in claim 12, wherein the one-dimensional carbon nanostructure is selected from a group consisting of single-walled carbon nanotube, carbon nanowire, multi-walled carbon nanotube, and multi-walled carbon nanotube yarn.

14. The liquid crystal cell assembly as claimed in claim 12, wherein the one-dimensional semiconductor nanostructure is selected from a group consisting of silicon nanotube, silicon nanowire, gallium-nitride nanotube, gallium-nitride nanowire, zinc-oxide nanotube, zinc-oxide nanobelt and zinc-oxide nanowire.

15. The liquid crystal cell assembly as claimed in claim 12, wherein the one-dimension metal nanastructure is selected from a group consisting of iron nanotube, iron nanowire, gold nanotube, gold nanowire, titanium nanotube, titanium nanowire, copper nanotube, copper nanobelt and copper nanowire.

16. A liquid crystal cell assembly for liquid crystal display, comprising:
    a first base plate having an inner surface;
    a second base plate having an inner surface and being opposite to the inner surface of the first base plate;
    a first alignment film arranged on the inner surface of the first base plate, the first alignment film comprising a plurality of juxtaposed one-dimensional nanostructures oriented in a first direction that is parallel to the inner surface of the first plate;
    a second alignment film arranged on the inner surface of the second base plate; and
    a liquid crystal layer sandwiched between the first alignment film and the second alignment film.

17. The liquid crystal. cell assembly as claimed in claim 16, wherein the second alignment film comprises a plurality of juxtaposed one-dimensional nanostructures oriented in a second direction perpendicular to the first direction, the one-dimensional nanostructures cooperatively functioning as at least one of a second polarizer and a second transparent electrode.

18. The liquid crystal cell assembly as claimed in claim 16, wherein a thickness of the first alignment film is in a range from about 1 nanometer to about 1 micron.

19. The liquid crystal cell assembly as claimed in claim 16, wherein a thickness of the second alignment film is in a range from about 1 nanometer to about 1 micron.

* * * * *